United States Patent
Semturs et al.

(10) Patent No.: US 8,892,596 B1
(45) Date of Patent: Nov. 18, 2014

(54) IDENTIFYING RELATED DOCUMENTS BASED ON LINKS IN DOCUMENTS

(75) Inventors: Christopher Semturs, Ottenbach (CH); Piyush Prahladka, Sunnyvale, CA (US)

(73) Assignee: Google Inc., Moutain View, CA (US)

( * ) Notice: Subject to any disclaimer, the term of this patent is extended or adjusted under 35 U.S.C. 154(b) by 168 days.

(21) Appl. No.: 13/569,948

(22) Filed: Aug. 8, 2012

(51) Int. Cl.
*G06F 17/30* (2006.01)

(52) U.S. Cl.
USPC ............ 707/769; 707/760; 707/761; 707/770

(58) Field of Classification Search
CPC .......... G06F 17/30669; G06F 17/2872; G06F 17/3053; G06F 17/28
USPC ......................... 707/759, 760, 761, 769, 770
See application file for complete search history.

(56) References Cited

U.S. PATENT DOCUMENTS

| | | | | |
|---|---|---|---|---|
| 7,814,103 B1 * | 10/2010 | Gravano et al. | ............... | 707/736 |
| 7,996,402 B1 * | 8/2011 | Gravano et al. | ............... | 707/736 |
| 8,051,061 B2 * | 11/2011 | Niu et al. | ...................... | 707/706 |
| 8,271,869 B2 * | 9/2012 | Aue | ............................. | 715/234 |
| 8,631,010 B1 * | 1/2014 | Gravano et al. | ............... | 707/736 |
| 2007/0266024 A1 * | 11/2007 | Cao | ................................... | 707/6 |
| 2007/0288448 A1 * | 12/2007 | Datta | ............................. | 707/5 |
| 2010/0211567 A1 * | 8/2010 | Abir | ............................. | 707/730 |
| 2013/0031122 A1 * | 1/2013 | Riezler et al. | ................. | 707/760 |

* cited by examiner

*Primary Examiner* — Monica Pyo
(74) *Attorney, Agent, or Firm* — Harrity & Harrity, LLP

(57) ABSTRACT

A device may identify, in a first document, a reference to a second document, the second document being different than the first document; identify that the reference to the second document is associated with a relation indicator; determine, based on identifying that the reference to the second document includes a relation indicator, that content of the second document is related to content of the first document; and process the second document based on determining that content of the second document is related to content of the first document.

20 Claims, 13 Drawing Sheets

Select a language:
510   German ← 505
   French
506 Spanish ← 507
   Taiwanese
508

515
Click here to view this page in German.

520      525      530

Select a country:
540   Germany ← 535
   France
536 Spain ← 537
   Taiwan
538

US 8,892,596 B1

IDENTIFYING RELATED DOCUMENTS BASED ON LINKS IN DOCUMENTS

BACKGROUND

The World Wide Web ("web") contains vast amounts of information. This information may be presented via documents, such as web pages. In many instances, different versions of web pages may exist. For example, content of a first web page may have a similar meaning to content of a second web page. However, the content of the first web page may include text written in English, while the content of the other web page may include text written in German.

SUMMARY

According to some implementations, a method may include identifying, in a first document, a reference to a second document, the second document being different than the first document; identifying that the reference to the second document is associated with a relation indicator; and determining, based on identifying that the reference to the second document includes a relation indicator, that content of the second document is related to content of the first document. Determining that the content of the second document is related to the content of the first document may include translating the first document to obtain a translated first document, comparing the translated first document to the second document to obtain a measure of similarity between the translated first document and the second document, and determining, based on the comparing, that the content of the second document is related to the content of the first document when the measure of similarity satisfies a particular similarity threshold. The method may further include processing the second document based on determining that the content of the second document is related to the content of the first document.

According to some implementations, identifying that the reference to the second document is associated with a relation indicator may include identifying that the reference to the second document is associated with at least one of a name of a language, an image that represents a language, a name of a geographic region, or an image that represents a geographic region.

According to some implementations, the reference to the second document may include a link. Identifying that the reference to the second document is associated with a relation indicator may include analyzing an anchor associated with the link; and identifying that the anchor associated with the link includes the relation indicator.

According to some implementations, the method may further include receiving, from a client device, a search query; identifying that the first document and the second document are responsive to the search query; identifying a particular language or a particular region associated with the client device; and identifying that the second document is associated with the particular language or the particular region. Processing the second document may include presenting information identifying the second document as a search result for the search query; and forgoing presenting information identifying the first document as a search result for the search query, based on identifying that the second document is associated with the particular language or the particular region and determining that the content of the second document is related to the content of the first document.

According to some implementations, the method may further include providing information regarding the first document for display at a client device; identifying a particular language associated with the client device; and identifying that the second document is associated with the particular language. Processing the second document may include presenting, in connection with the information regarding the first document, an option to access the second document.

According to some implementations, the method may further include identifying, in the second document, a reference to the first document. Determining that the content of the second document is related to the content of the first document may further be based on identifying that the second document includes the reference to the first document.

According to some implementations, determining that the content of the second document is related to the content of the first document may include identifying a first update frequency associated with the first document; identifying a second update frequency associated with the second document; comparing the first update frequency to the second update frequency to obtain a measure of similarity between the first update frequency and the second update frequency; and determining, based on the comparing, that the content of the second document is related to the content of the first document when the measure of similarity satisfies a particular similarity threshold.

According to some implementations, the method may further include identifying selection activity regarding at least one of the first document or the second document. Determining that the content of the second document is related to the content of the first document is based on the identified selection activity.

The above discussion mentions examples in which some implementations may be implemented via one or more methods. In some implementations, one or more systems and/or devices may be configured to perform one or more of the acts mentioned above. In some implementations, a computer-readable medium may include computer-executable instructions which, when executed by one or more processors, cause the one or more processors to perform one or more of the acts mentioned above.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

The concepts described herein may be applied to sets of documents. A document may be broadly interpreted to include any machine-readable and machine-storable work product. A document may include, for example, an e-mail, a web site, a file, a combination of files, one or more files with embedded links to other files, a news group posting, a news article, a blog, a business listing, an electronic version of printed text, a web advertisement, etc. In the context of the Internet, a common document is a web page. Documents often include textual information and may include embedded information, such as meta information, images, hyperlinks, etc., and/or embedded instructions, such as Javascript, etc.

A system and/or method, described herein, may identify documents that are related to each other. Specifically, for example, a system according to one or more implementations may be configured to identify a first document that includes a translation of a second document. In some implementations, the system may identify a first link from the first document to the second document, and/or a second link from the second document to the first document. The system of some implementations may identify that the first and/or second links include relation indicators, such as a name of a language, a name of a geographical region, a picture of a flag, etc.

In some implementations, the system may perform one or more verification processes to verify that these documents are related. In some implementations, the system may present information regarding the related documents in a manner that indicates that these documents are related. By identifying documents that are related to each other, the system of some implementations may provide information regarding related documents in an efficient manner, thus improving a user's experience.

Figure 1A:
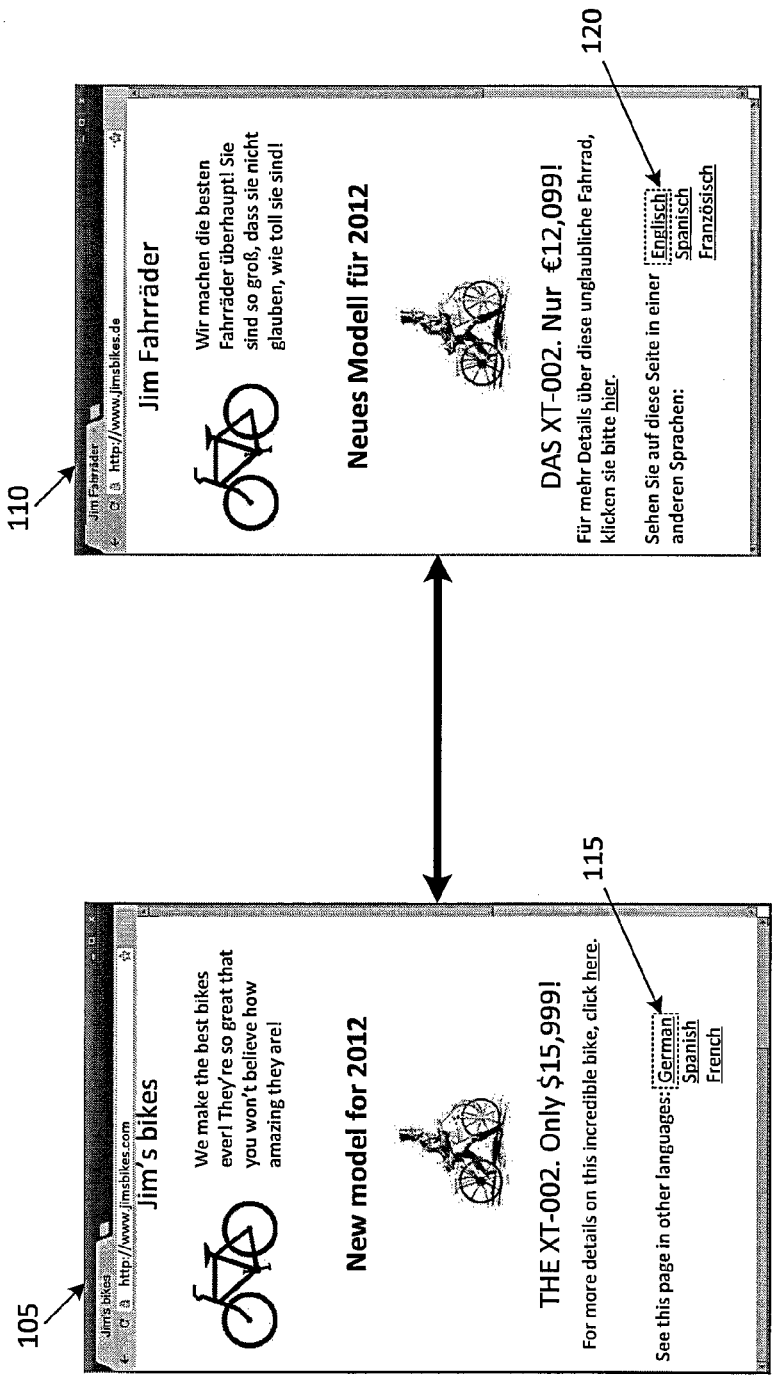
FIGS. 1A-1C illustrate an overview of example implementations described herein.

As shown in FIG. 1A, document 105 may include content corresponding to the English language, and document 110 may include content corresponding to the German language. In this example, some or all of the content of document 110 is a German version of the content of document 105. In other words, some or all of the content of document 105 is an English version of the content of document 110.

Document 105 may include a set of links. A particular link 115 may be a link to document 110. Link 115 may be associated with a relation indicator. For example, as shown in FIG. 1A, anchor text associated with link 115 may include the word "German." Additionally, as shown in FIG. 1A, link 115 may appear on document 105 near the phrase "See this page in other languages," which may also be a relation indicator.

Document 110 may also include a set of links. A particular link 120, on document 110, may be a link to document 105. Link 120 may be associated with a relation indicator. For example, as shown in FIG. 1A, anchor text associated with link 120 may include the word "Englisch," which may be a German translation of the word "English." Additionally, as shown in FIG. 1A, link 120 may appear on document 110 near the phrase "Sehen Sie auf diese Seite in einer anderen Sprachen," which may be a German translation of the phrase "See this page in other languages." In some implementations, this phrase may also be a relation indicator.

A system, according to one or more implementations described herein, may identify, based on one or more of the above-mentioned relation indicators, that document 105 includes a translation of some or all of document 110, and/or that document 110 includes a translation of some or all of document 105. The system may present information regarding one or both of documents 105 and/or 110 based on making this identification.

Figure 1B:
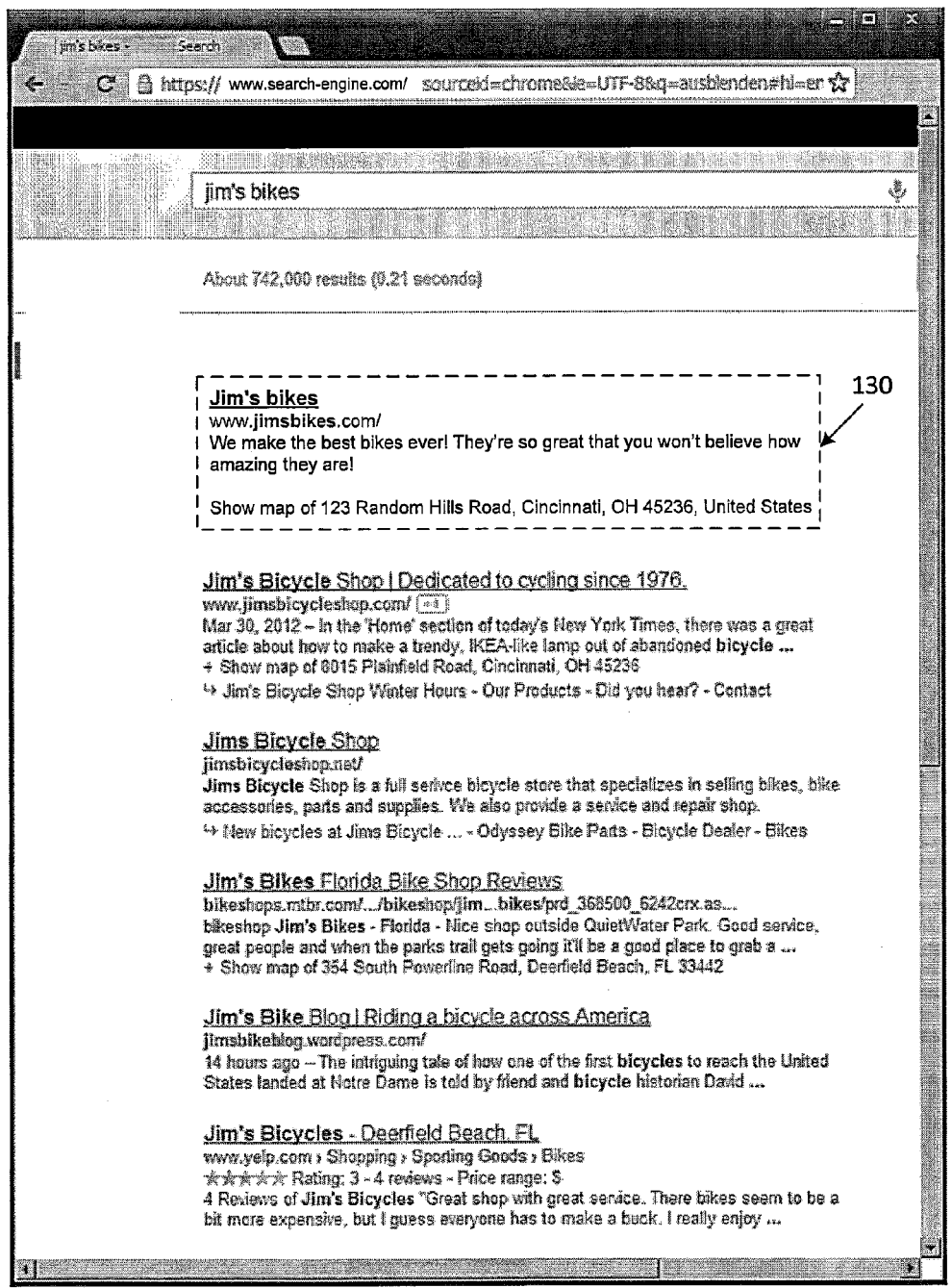

Referring to FIG. 1B, assume that a user initiates a search using a search engine located at the Uniform Resource Locator ("URL"), search-engine.com, based on the search query "Jim's bikes." The system may identify both of documents 105 and 110 as candidates to present as search results based on this search query. In some implementations, the system may identify a language associated with this search query. For instance, the system may identify that the language is English based on content of the search query—e.g., English words; that the search query was submitted at www.search-engine.com—e.g., a search engine associated with the English language; and/or using any other technique.

As shown in FIG. 1B, the system of some implementations may provide search result document 125, which may include information regarding a set of search results. The search results may include a particular search result 130, which is associated with document 105—e.g., a document that includes English, as discussed above. In this example, the system may forgo presenting information associated with document 110—e.g., a document that includes a German translation of document 105—based on identifying that the search query is associated with English, and identifying that an English document is available. In such an implementation, it may be advantageous to forgo displaying information regarding document 110, since it is likely that the user is interested in English documents, and not German documents.

Figure 1C:
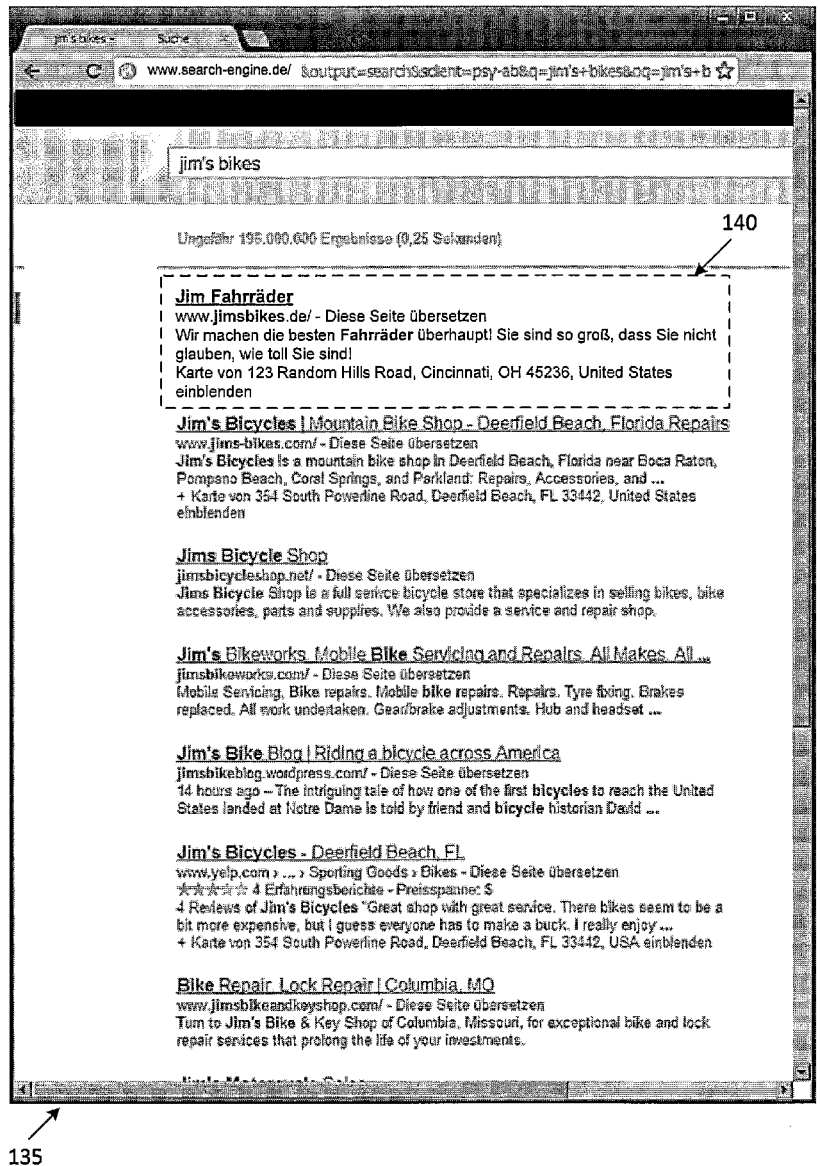

Referring to FIG. 1C, assume that a user initiates a search, using www.search-engine.de, based on the search query "Jim's bikes." The system may identify both of documents 105 and 110 as candidates to present as search results based on this search query. In some implementations, the system may identify a language associated with this search query. For instance, the system may identify that the language is German based on, e.g., the fact that the search query was submitted at www.search-engine.de—e.g., a search engine associated with the German language. That is, in some implementations, the system may infer, based on the user submitting the query at www.search-engine.de, that the user prefers German language search results.

As shown in FIG. 1C, the system of some implementations may provide search result document 135, which may include information regarding a set of search results. The search results may include a particular search result 140, which is associated with document 110—e.g., a document that includes German, as discussed above. In this example, the system may forgo presenting information associated with document 105—e.g., a document that includes an English translation of document 110—based on identifying that the search query is associated with German, and identifying that a German document is available. In such an implementation, it may be advantageous to forgo displaying information regarding document 105, since it is likely that the user is interested in German documents, and not English documents.

Figure 2:
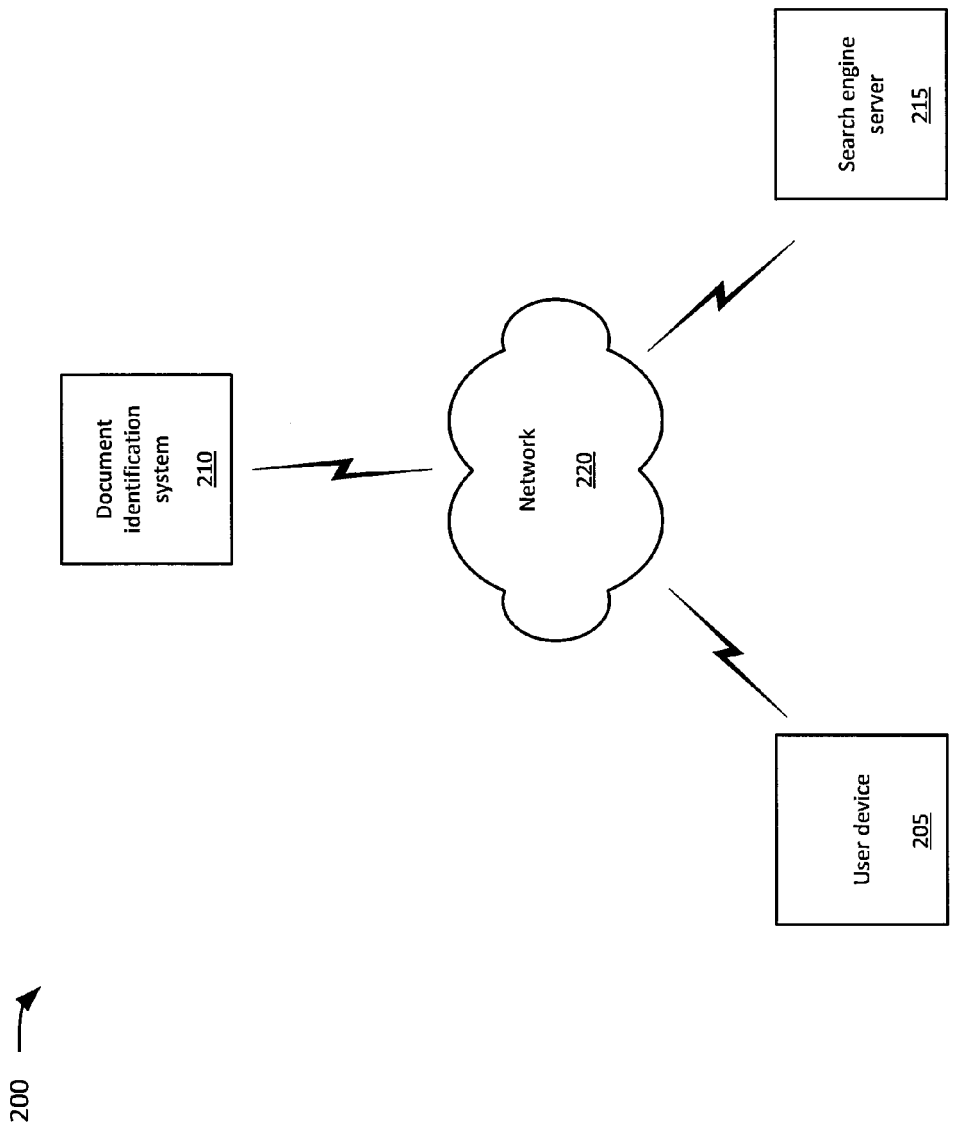
FIG. 2 illustrates an example environment in which systems and/or methods described herein may be implemented.

FIG. 2 is a diagram of an example environment 200 in which systems and/or methods described herein may be implemented. Environment 200 may include user device 205, document identification system 210, and search engine server 215 connected to network 220. One user device 205 and two servers 210 and 215 have been illustrated as connected to network 220 for simplicity. In practice, environment 200 may include additional user devices and/or servers or fewer user devices and/or servers. Also, in some instances, a user device may perform a function of a server, or a server may perform a function of a user device.

User device 205 may include a client device, such as a mobile telephone, a personal computer, a personal digital assistant ("PDA"), a tablet computer, a laptop, a television, a set-top box, or any other type of computation or communication device. User device 205 may include audio input/output devices that allow a user to communicate with user device 205 via speech. For example, these audio input/output devices may include one or more microphones and/or one or more speakers. User device 205 may also include one or more visual input/output devices, such as one or more cameras and/or one or more display screens that are capable of presenting a user interface via which a user may interact.

Servers 210 and 215 may each be implemented as a single server device or a collection of server devices that may be co-located or remotely located. Additionally, or alternatively, servers 210 and 215 may be implemented together within a single, common server device or a single, common collection of server devices.

Document identification system 210 may include one or more server devices. In some implementations, as further described below, document identification system 210 may identify documents that are related to each other—e.g., documents that include translations of each other. In some implementations, and as also described further below, document identification system 210 may also present information regarding documents that are related to each other.

Search engine server 215 may include one or more server devices. In some implementations, search engine server 215 may implement a search engine that receives queries, e.g., from client 205 and/or from document identification system 210. Search engine server 215 may provide one or more search results in response to the received queries. The search results may include information regarding one or more documents, such as a link to the one or more documents.

Additional servers, implementing other functions, although not explicitly shown, may also be implemented in environment 200. For example, environment 200 may include one or more servers that store an index that includes information regarding documents—e.g., hundreds of thousands, millions, or more documents. Environment 200 may also include one or more servers that identify documents that are related. For example, such a server may identify a particular domain name that is associated with another domain name.

Document identification system 210 may analyze documents associated with the index and/or the one or more servers, that store information identifying documents that are related, when identifying documents that are related. Additionally, or alternatively, environment 200 may include other servers, such as servers that provide, for example, web content, payment services, shopping services, social networking services, etc.

Network 220 may include any type of network, such as a local area network ("LAN"), a wide area network ("WAN"), a telephone network—e.g., the Public Switched Telephone Network ("PSTN") or a cellular network—an intranet, the Internet, or a combination of networks. User device 205, document identification system 210, and/or search engine system 215 may connect to network 220 via wired and/or wireless connections. In other words, user device 205, document identification system 210, and/or search engine server 215 may connect to network 220 via a wired connection, a wireless connection, or a combination of a wired connection and a wireless connection.

Figure 3:
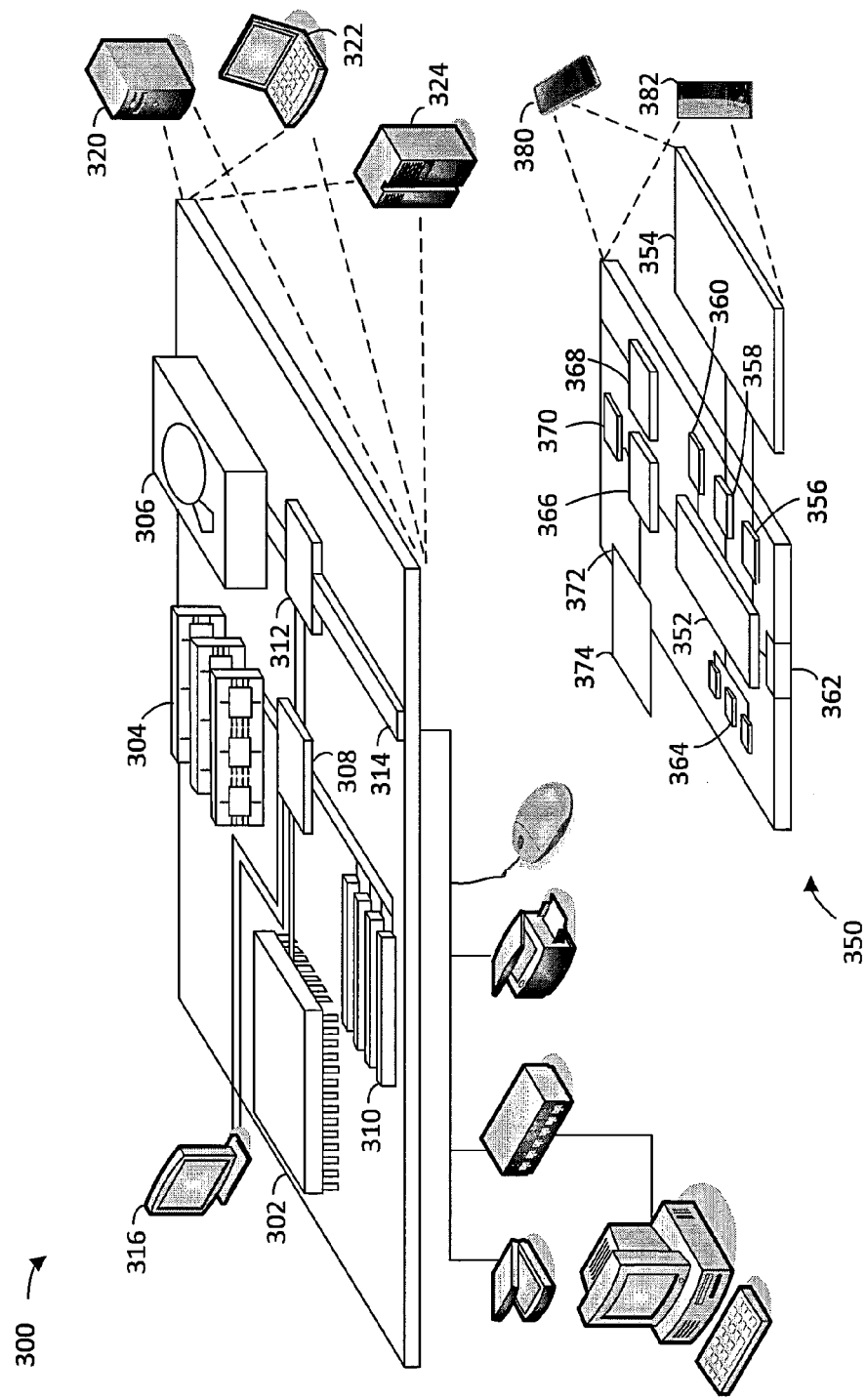
FIG. 3 illustrates an example of a generic computer device and a generic mobile computer device according to one or more implementations.

FIG. 3 shows an example of generic computing device 300 and generic mobile computing device 350, which may be used with the techniques described here. Computing device 300 and mobile computing device 350 may correspond to, for example, any of user device 205, document identification system 210, and/or search engine server 215. Each of user device 205, document identification system 210, and/or search engine server 215 may include one or more computing devices 300, mobile computing devices 350, or components of computing device 300 and/or mobile computing device 350.

Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described and/or claimed in this document.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface ("GUI") on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, e.g., as a server bank, a group of blade servers, or a multi-processor system, etc.

Memory 304 stores information within the computing device 300. In some implementations, memory 304 includes a volatile memory unit or units. In some implementations, memory 304 includes a non-volatile memory unit or units. The memory 304 may also be another form of computer-readable medium, such as a magnetic or optical disk. A computer-readable medium may be defined as a non-transitory memory device. A memory device may include space within a single physical memory device or spread across multiple physical memory devices.

Storage device 306 is capable of providing mass storage for the computing device 300. In some implementations, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In some implementations, high-speed controller 308 is coupled to memory 304, display 316, e.g., through a graphics processor or accelerator, and to high-speed expansion ports 310, which may accept various expansion cards. In this implementation, low-speed controller 312 is coupled to storage device 306 and low-speed expansion port 314. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device, such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a Thin-Film-Transistor Liquid Crystal Display ("TFT LCD") or an Organic Light Emitting Diode ("OLED") display, or other appropriate display technology. Display interface 356 may include appropriate circuitry for driving display 354 to present graphical and other information to a user. Control interface 358 may receive commands from a user and convert them for submission to the processor 352. In addition, an external interface 362 may be in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a Single In Line Memory Module ("SIMM") card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In some implementations, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver. In addition, Global Positioning System ("GPS") receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound, e.g., voice messages, music files, etc., and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed application specific integrated circuits ("ASICs"), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" and "computer-readable medium" refer to any non-transitory apparatus and/or device, e.g., magnetic discs, optical disks, memory, Programmable Logic Devices ("PLDs"), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device, e.g., a cathode ray tube ("CRT") or liquid crystal display ("LCD") monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described herein can be implemented in a computing system that includes a back end component, e.g., as a data server, or that includes a middleware component, e.g., an application server, or that includes a front end component, e.g., a client computer having a graphical user interface or a Web browser through which a user can interact with implementations of the systems and techniques described here, or any combination of such back end, middleware, or front end components. The components of the system can be interconnected by any form or medium of digital data communication, e.g., a communication network. Examples of communication networks include a LAN, a WAN, and the Internet.

Figure 4:
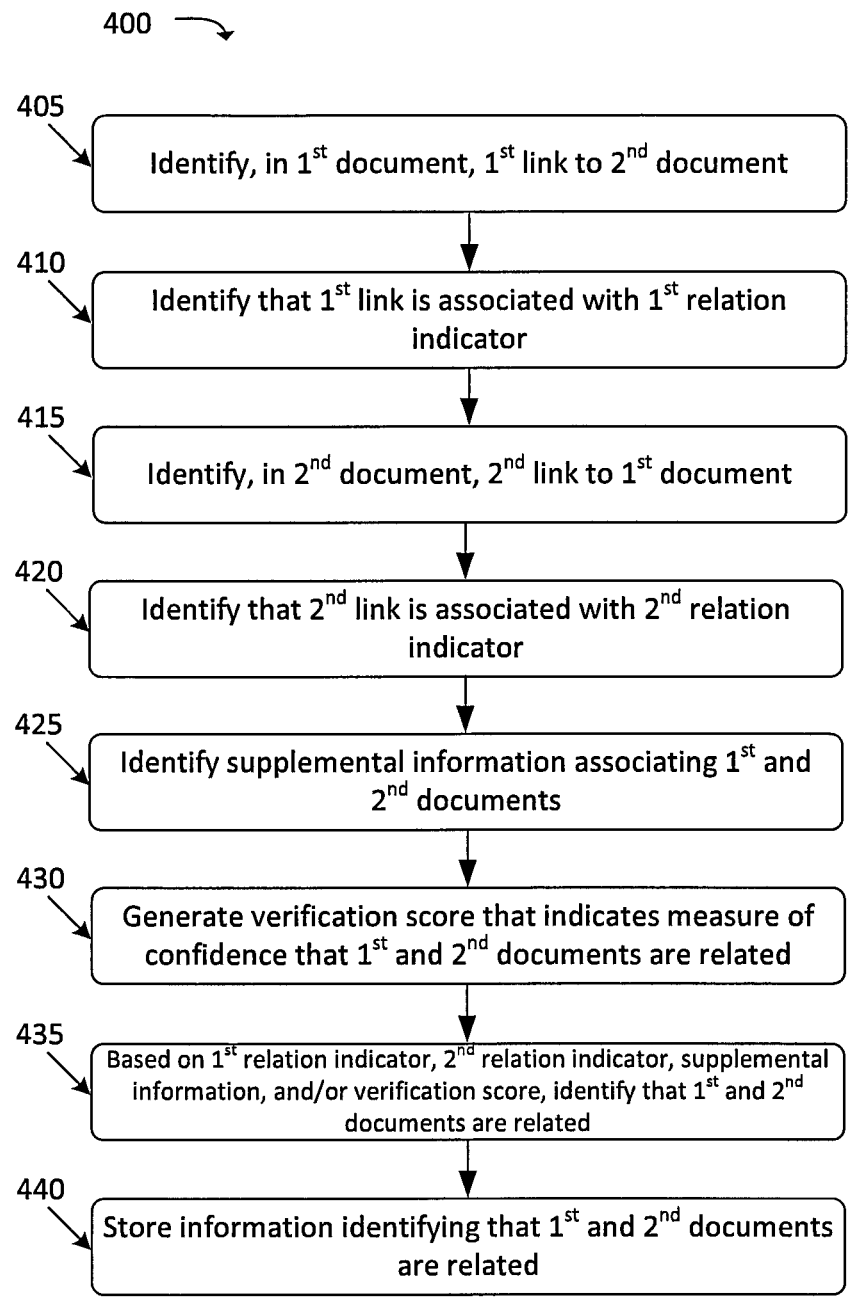
FIG. 4 illustrates a flowchart of an example process for related documents, according to one or more implementations described herein.

FIG. 4 illustrates a flowchart of an example process 400 for identifying related documents. In some implementations, process 400 may be performed by document identification system 210. In some implementations, process 400 may be performed by one or more other components instead of, or possibly in conjunction with, document identification system 210. For example, in some implementations, some or all of process 400 may be performed by user device 205 or search engine server 215.

Process 400 may include identifying, in a first document, a first link to a second document (block 405). For example, document identification system 210 may identify a first document. Referring to the example shown in FIG. 1A, assume that the first document corresponds to document 105, which is associated with the English language. Further assume, for the purposes of this example, that the first link corresponds to link 115. Still further, assume that link 115 references document 110, which is associated with the German language. As mentioned above, document identification system 210 may communicate with one or more servers, such as one or more servers associated with an index, in order to identify the first document. Document identification system 210 may analyze information regarding the first document to identify the first link to a second document.

Process 400 may also include identifying that the first link is associated with a first relation indicator (block 410). For example, document identification system 210 may analyze information associated with the first document to identify one or more relation indicators associated with the first link. For example, document identification system 210 may identify that anchor text associated with link 115 includes the word "German," which is the name of a language. As described in further detail immediately below, document identification system 210 may identify, based on identifying that anchor text associated with link 115 includes the word "German," that link 115 is associated with a first relation indicator.

Figures 5A, 5B, 5C, 5D:
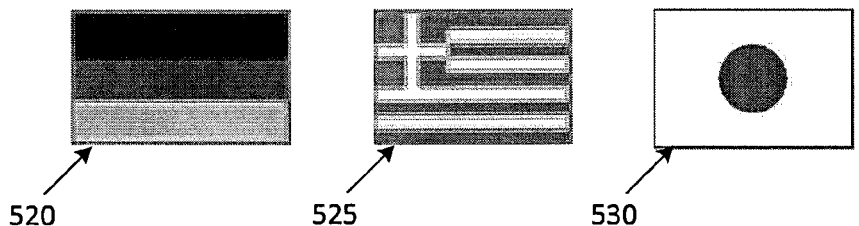
FIGS. 5A-5D illustrate examples of relation indicators, according to one or more implementations described herein.

FIGS. 5A-5D illustrate some examples of relation indicators, according to some implementations, which document identification system 210 may identify at block 410. For instance, as shown in FIG. 5A, document identification system 210 may identify a set of links, such as example links 505-508, in the first document. Document identification system 210 may identify that anchor text associated with one or more of links 505-508 is associated with a name of a language. For example, document identification system 210 may identify that anchor text associated with link 505 includes "German," which is a name of a language. Based on identifying that the anchor text associated with link 505 includes the name of a language, document identification system 210 may identify that link 505 is associated with a relation indicator. Similarly, document identification system 210 may identify that links 506-508 are associated with relation indicators, based on anchor text for links 506-508 including names of languages—e.g., "French," "Spanish," and "Taiwanese," respectively.

As also shown in FIG. 5A, the first document may include phrase 510, which includes the words "Select a language." Document identification system 210 may identify phrase 510 as being associated with a relation indicator. For instance, document identification system 210 may compare some or all of phrase 510 to a particular list of phrases and/or words that are associated with relation indicators, and identify that some or all of phrase 510 partially or fully matches one or more phrases and/or words in the particular list of phrases and/or words. Additionally, or alternatively, document identification system 210 may use any other technique, such as semantic analysis, to identify that phrase 510 is a relation indicator.

Document identification system 210 may identify that phrase 510 is proximate to one or more of links 505-508. For example, document identification system 210 may identify that phrase 510 is within a particular quantity of characters, in the first document, of one or more of links 505-508. Additionally, or alternatively, document identification system 210 may identify that phrase 510 is within a particular graphical distance, in the first document, of one or more of links 505-508. Additionally, or alternatively, document identification system 210 may use any other technique, such as semantic analysis, to identify that phrase 510 is proximate to one or more of links 505-508. Based on identifying that phrase 510 is a relation indicator, and that phrase 510 is proximate to one or more of links 505-508, document identification system 210 may identify that the one or more of links 505-508 are associated with a relation indicator.

As shown in FIG. 5B, the first document may include link 515, which is associated with the anchor text "here." The anchor text associated with link 515 may be included in the example sentence "Click here to view this page in German." Document identification system 210 may identify that the word "German" is a relation indicator. For instance, document identification system 210 may compare the word "German" to a particular list of phrases and/or words that are associated with relation indicators, and identify that some or all of the word "German" partially or fully matches one or more phrases and/or words in the particular list of phrases and/or words. In some implementations, the particular list of phrases and/or words may include names of languages and/or geographical regions.

Document identification system 210 may identify that the word "German" is proximate to link 515. For example, document identification system 210 may identify that the word "German" is in the same sentence as anchor text associated with link 515. Additionally, or alternatively, document identification system 210 may identify that the word "German" is within a particular quantity of characters of link 515. Additionally, or alternatively, document identification system 210 may identify that the word "German" is within a particular graphical distance, in the first document, of link 515. Based on identifying that the word "German" is a relation indicator, and that the word "German" is proximate to link 515, document identification system 210 may identify that link 515 is associated with a relation indicator.

As shown in FIG. 5C, the first document may include images 520-530. Images 520-530 may represent flags of various geographical regions, such as countries. For example, image 520 may represent the flag of Germany, image 525 may represent the flag of Greece, and image 530 may represent the flag of Japan. Document identification system 210 may identify that images 520-530 are associated with relation indicators. For example, document identification system 210 may compare one or more of images 520-530 to a particular set of images that are associated with relation indicators, and may identify that one or more of images 520-530 fully or partially match one or more images in the particular set of images. In some implementations, the particular set of images may include images that represent flags of geographical regions, such as countries.

Additionally, or alternatively, in some implementations, document identification system 210 may analyze file names associated with images, in order to identify whether the images are associated with relation indicators. For example, document identification system 210 may identify that a particular image, having the file name "GermanyFlag.gif," may be associated with a relation indicator.

Additionally, or alternatively, images may represent geographical regions in other ways, such as by including outlines of geographical regions, such as countries, states, provinces, etc. In some implementations, one particular image may be associated with a single geographical region and/or language. In some implementations, one particular image may be associated with multiple geographical regions and/or languages. For example, a particular image may include a world map. In this example, different portions of the image may be associated with different regions and/or languages.

Document identification system 210 may identify one or more links associated with images 520-530. For example, assume that the first document is a web page, and that image 520 is an anchor associated with a particular link on the web page. The web page may include Hypertext Markup Language ("HTML") code, such as:

<A HREF="www.foo.de"><IMG SRC="GermanyFlag.gif"></A>.

This example HTML code may signify that image 520 represents a link to a document located at "www.foo.de." Based on identifying that image 520 is associated with a translation identifier, and based on identifying that the link to the document located at "www.foo.de" is associated with image 520, document identification system 210 may identify that the link to the document located at "www.foo.de" is associated with a translation identifier.

Additionally, or alternatively, document identification system 210 may identify that a link is located, on the first document, proximate to image 520. For example, document identification system 210 may identify that the link is located within a particular graphical distance from image 520 on the first document. Based on identifying that image 520 is associated with a translation identifier, and based on identifying that the link is proximate to image 520, document identification system 210 may identify that the link is associated with a translation identifier.

As shown in FIG. 5D, the first document may include a set of links, such as example links 535-538, on the first document. Document identification system 210 may identify that anchor text associated with one or more of links 535-538 is associated with a name of a geographical region, such as a country. For example, document identification system 210 may identify that anchor text associated with link 535 includes "Germany," which is a name of a country. Based on identifying that the anchor text associated with link 535 includes the name of a country, document identification system 210 may identify that link 535 is associated with a relation indicator. Similarly, document identification system 210 may identify that links 536-538 are associated with relation indicators, based on anchor text for links 536-538 including names of countries—e.g., "France," "Spain," and "Taiwan," respectively.

As also shown in FIG. 5D, the first document may include phrase 540, which includes the words "Select a country." Document identification system 210 may identify phrase 540 as being associated with a relation indicator. For instance, document identification system 210 may compare some or all of phrase 540 to a particular list of phrases and/or words that are associated with relation indicators, and identify that some or all of phrase 540 partially or fully matches one or more phrases and/or words in the particular list of phrases and/or words. Additionally, or alternatively, document identification system 210 may use any other technique, such as semantic analysis, to identify that phrase 540 is a relation indicator.

Document identification system 210 may identify that phrase 540 is proximate to one or more of links 535-538. For example, document identification system 210 may identify that phrase 540 is within a particular quantity of characters, in the first document, of one or more of links 535-538. Additionally, or alternatively, document identification system 210 may identify that phrase 540 is within a particular graphical distance, in the first document, of one or more of links 535-538. Additionally, or alternatively, document identification system 210 may use any other technique, such as semantic analysis, to identify that phrase 540 is proximate to one or more of links 535-538. Based on identifying that phrase 540 is a relation indicator, and that phrase 540 is proximate to one or more of links 535-538, document identification system 210 may identify that the one or more of links 535-538 are associated with a relation indicator.

While examples of relation indicators are described above with respect to FIGS. 5A-5D, in practice, document identification system 210 may identify other relation indicators in documents. In some implementations, document identification system 210 may identify combinations of two or more relation indicators described above. For example, assume that a particular document includes a link that is associated with the anchor text "German," and that the particular document also includes an image that represents a German flag proximate to the link. Document identification system 210 may identify, based on the anchor text and/or the image of the German flag proximate to the link, that the link is associated with a relation indicator.

Returning to FIG. 4, process 400 may additionally include identifying, in a second document, a second link to the first document (block 415). Referring again to the example shown in FIG. 1A, document identification system 210 may identify link 120 in document 110, which refers to document 105.

Process 400 may further include identifying that the second link is associated with a second relation indicator (block 420). For example, document identification system 210 may identify that anchor text associated with link 120 includes the word "Englisch," which may be a German word for the word "English." Document identification system 210 may identify, based on identifying that the anchor text associated with link 120 includes the word "Englisch," that link 120 is associated with a relation indicator.

Process 400 may also include identifying supplemental information associating the first and second documents (block 425). As mentioned above, a server may store information that identifies documents that are related. For example, the server may identify that documents, associated with a first domain, are related to documents that are associated with a second domain. Referring back to the example shown in FIG. 1A, document 105 may be associated with the domain "jimsbikes.com," and document 110 may be associated with the domain "jimsbikes.de." Assume that the server stores information indicating that documents associated with the domain "jimsbikes.com" are related to documents associated with the domain "jimsbikes.de." Document identification system 210 may identify this information, associating document 105 with document 110, at block 425.

Process 400 may additionally include generating a verification score that indicates a measure of confidence that the first and second documents are related (block 430). For example, document identification system 210 may perform one or more verification techniques to generate the verification score. In some implementations, document identification system 210 may generate the verification score based on one of these verification techniques. In some implementations, document identification system 210 may generate the verification score based on a combination of verification techniques.

For example, document identification system 210 may generate the verification score based on a measure of similarity of the first and second documents. This measure of similarity may be based on, for example quantities of characters and/or words in the first and second documents, quantities and/or sizes of images in the first and second documents, layouts associated with the first and second documents, formatting associated with the first and second documents, and/or any other measure of similarity.

Additionally, or alternatively, document identification system 210 may generate the verification score based on a selection history associated with the first and second documents. For example, assume that document identification system 210 receives information indicating that the second document was presented as a translation of the first document on several occasions. Further assume that document identification system 210 receives information indicating that user devices often accessed the first document, after the second document was presented as a translation of the first document. Such a scenario may occur when the second document has been erroneously identified as a translation of the first document. In this situation, document identification system 210 may generate a verification score that reflects that the first and second documents are not related.

As another example, assume that document identification system 210 receives information indicating that the second document was presented as a translation of the first document on several occasions. Further assume that document identification system 210 receives information indicating that user devices often did not access the first document, after the second document was presented as a translation of the first document. Such a scenario may occur when the second document has been correctly identified as a translation of the first document. In this situation, document identification system 210 may generate a verification score that reflects that the first and second documents are related.

Additionally, or alternatively, document identification system 210 may generate the verification score based on entities associated with the first and second documents. For example, in some implementations, document identification system 210 may identify a set of entities—e.g., names of people, geographical regions, objects, movies, songs, physical landmarks, etc.—associated with the first document. Document identification system 210 may also identify a set of entities associated with the second document. Document identification system 210 may compare the set of entities, associated with the first document, with the set of entities associated with the second document. In some implementation, when comparing the set of entities, document identification system 210 may compare versions of the entities associated with languages associated with the documents. For instance, assume that first document is associated with English, and that the second document is associated with German. Further assume that document identification system 210 identifies the entity "Jim's Bikes" on the first document, and the entity "Jim's Fahrrader"—that is, a German translation of "Jim's Bikes" on the second document. Document identification system 210 may identify that these entities refer to the same entity. Document identification system 210 may generate the verification score based on comparing these sets of entities.

For example, assume that the set of entities, associated with the first document, includes all of the entities in the set of entities associated with the second document, and/or vice versa. In this situation, document identification system 210 may generate a verification score that reflects that the first and second documents are related, based on identifying that the set of entities, associated with the first document, includes all of the entities in the set of entities associated with the second document, and/or vice versa.

As another example, assume that the set of entities, associated with the first document, includes at least a particular quantity of entities that are not in the set of entities associated with the second document, and/or vice versa. In this situation, document identification system 210 may generate a verification score that reflects that the first and second documents are not related, based on identifying that the set of entities, associated with the first document, includes at least a particular quantity of entities that are not in the set of entities associated with the second document, and/or vice versa.

Further examples of some techniques, which document identification system 210 may use when generating verification scores, are described below with respect to FIGS. 6 and 7. For example, as described below with respect to FIG. 6, document identification system 210 may generate a verification score based on performing a translation of the first document, and comparing the translation of the first document to the second document. As described below with respect to FIG. 7, document identification system 210 may generate a verification score based on comparing information updates to the first and second documents.

Process 400 may further include identifying that the first and second documents are related, based on the first relation indicator, the second relation indicator, supplemental information, and/or the verification score (block 435). For example, based on the first relation indicator identified at block 410, the second relation indicator identified at block 420, the supplemental information identified at block 425, and/or the verification score generated at block 430, document identification system 210 may identify that the first and second documents are related.

Process 400 may also include storing information identifying that the first and second documents are related (block 440). For example, document identification system 210 may store information identifying that the first and second documents are related. Additionally, or alternatively, document identification system 210 may output this information to one or more other devices, such as one or more server devices that store information indicating documents that are related.

Although a series of blocks is shown in FIG. 4, in some implementations, process 400 may include fewer, additional, or different blocks. For example, in some implementations, process 400 may not include blocks 415 and 420. In some such implementations, block 435 may include identifying that the first and second documents are related based on the first relation indicator, supplemental information, and/or the verification score. In some implementations, process 400 may not include blocks 415, 420, and 430. In some of these implementations, block 435 may include identifying that the first and second documents are related based on the first relation indicator and/or supplemental information. In some implementations, process 400 may not include blocks 415-430. In some of these implementations, block 435 may include identifying that the first and second documents are related based on the first relation indicator.

In some implementations, in some implementations, process 400 may not include block 420. In some such implementations, block 435 may include identifying that the first and second documents are related based on the first relation indicator, based on identifying that the second document includes a link to the first document, supplemental information, and/or the verification score. While some examples of different variations of process 400 are mentioned immediately above, in practice, other variations of process 400 are possible.

Figure 6:
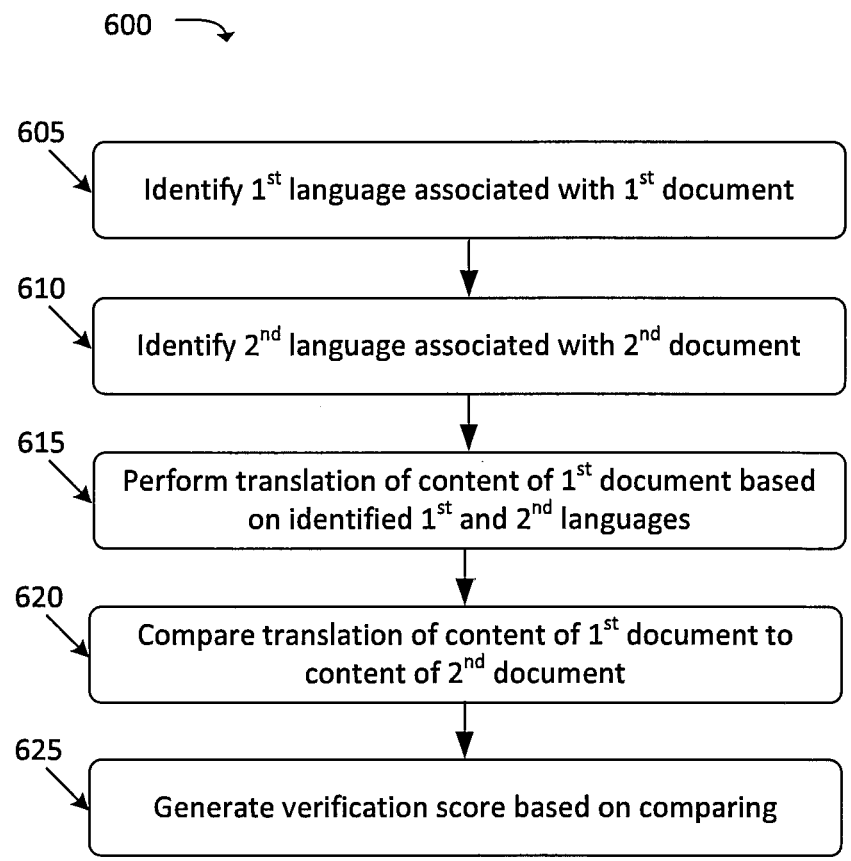
FIGS. 6 and 7 illustrate flowcharts of example processes for verifying that content of a document is related to content of another document, according to one or more implementations described herein.
Figure 7:
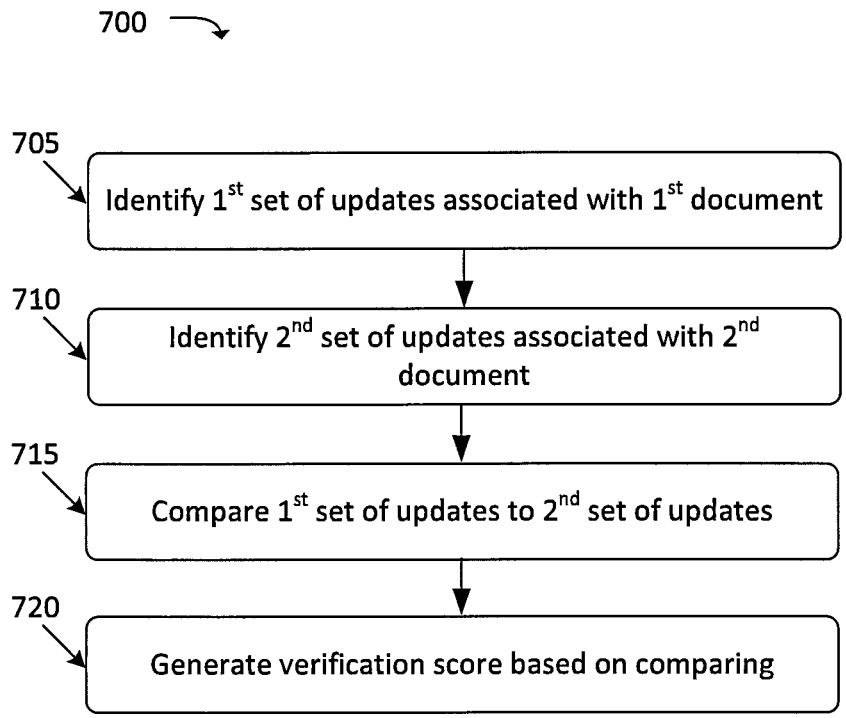

FIGS. 6 and 7 illustrate flowcharts of example processes 600 and 700, respectively, for generating a verification score. As mentioned above, one or both of processes 600 and/or 700 may correspond to block 430 of process 400. In some implementations, one or both of processes 600 and/or 700 may be performed by document identification system 210. In some implementations, one or both of processes 600 and/or 700 may be performed by one or more other components instead of, or possibly in conjunction with, document identification system 210. For example, in some implementations, some or all of process 600 and/or some or all of process 700 may be performed by user device 205 or search engine 215.

Process 600, shown in FIG. 6, may include identifying a first language associated with a first document (block 605). Referring to the example shown in FIG. 1A, document identification system 210 may, for example, identify that document 105 is associated with the English language. In order to identify the language associated with document 105, document identification system 210 may identify language indicators associated with document 105. For example, document 105 may include meta information, such as tags, that indicate that the language associated with document 105 includes English content. Additionally, or alternatively, document identification system 210 may analyze content of document 105 to identify that the document includes English content. For example, document identification system 210 may identify that at least a particular quantity and/or proportion of the words in the content of document 105 are English words.

Process 600 may also include identifying a second language associated with a second document (block 610). Referring again to the example shown in FIG. 1A, and as similarly described above, document identification system 210 may identify that document 110 is associated with the German language.

Process 600 may further include performing a translation of content of the first document based on the identified first and second documents (block 615). For example, document identification system 210 may use one or more translation techniques to translate some or all of the content of document 105 from English to German. Additionally, or alternatively, document identification system 210 may provide some or all of the content to one or more devices that implement translation techniques, and may receive the translation of document 105 from English to German.

Process 600 may additionally include comparing the translation of the content of the first document to content of the second document (block 620). For example, document identification system 210 may compare some or all of the translation of document 105, performed at block 615, to content of document 110.

Process 600 may also include generating a verification score based on the comparing (block 625). For example, document identification system 210 may generate a verification score based on how closely the translation of the content of document 105 matches the content of document 110. In some implementations, in order to generate the verification score, document identification system 210 may identify a quantity and/or a proportion of words in the translation of the content of document 105 that fully or partially match words in the content of document 110. For example, assume that document identification system 210 identifies that the translation of the content of document 105 includes the word "fahrrad," and that the content of document 110 includes the word "fahrräder." In some implementations, document identification system 210 may identify that the word "fahrrad," in the translation of the content of document 105, partially matches the word "fahrräder," in the content of document 110.

Although a series of blocks is shown in FIG. 6, in some implementations, process 600 may include fewer, additional, or different blocks. For example, in some implementations, process 600 may include performing a translation of content of the second document in addition to, or in lieu of, performing a translation of the first document. In some such implementations, process 600 may include comparing the translation of the content of the second document to content of the first document. Generating the verification score may also, or alternatively, be based on comparing the translation of the content of the second document to content of the first document.

Process 700, shown in FIG. 7, may include identifying a first set of updates associated with a first document (block 705). For example, document identification system 210 may receive information identifying one or more updates associated with document 105 from one or more devices that store information regarding updates associated with document 105. Assume that a webmaster associated with document 105 changes content of document 105, such as changing the phrase "Only $15,999!" to "Now just $14,999!" at a particular time $t_0$, and adds additional content to document 105 at another time $t_1$. Document identification system 210 may receive information regarding these updates at block 705.

Process 700 may also include identifying a second set of updates associated with a second document (block 710). For example, document identification system 210 may receive information identifying one or more updates associated with document 110 from one or more devices that store information regarding updates associated with document 110. Assume that a webmaster associated with document 110 changes content of document 105, such as changing the phrase "Nur € 12,099!" to "Jetzt nur € 11,049!" at a particular time $t_2$, and adds additional content to document 110 at another time $t_3$. Document identification system 210 may receive information regarding these updates at block 710.

Process 700 may further include comparing the first set of updates to the second set of updates (block 715). For example, document identification system 210 may compare times of updates identified at block 705, to times of updates identified at block 710. Additionally, or alternatively, document identification system 210 may compare content of updates identified at block 705 to content of updates identified at block 710.

Process 700 may additionally include generating a verification score based on the comparing (block 720). For example, document identification system 210 may generate a verification score based on the comparing performed at block 715. For instance, document identification system 210 may generate the verification score based on whether the times of updates are identical and/or similar. Continuing with the above example, assume that time $t_0$—which corresponds to an update to document 105, and time $t_2$—which corresponds to an update to document 110, correspond to the same time. The updates to the two different documents may indicate that these documents are under the control of the same party, which may serve as a potential indication that these documents are related. Document identification system 210 may generate the verification score based on identifying that times $t_0$ and $t_2$ are identical.

Further assume that time $t_1$, which corresponds to an update to document 105, and time $t_3$—which corresponds to an update to document 110, correspond to different times. Document identification system 210 may generate the verification score based on a difference between times $t_1$ and $t_3$. Additionally, or alternatively, document identification system 210 may identify whether a difference between times $t_1$ and $t_3$ is within a threshold difference. Such a situation may occur when a webmaster associated with both documents 105 and 110 changes documents 105 and 110 at slightly different times—e.g., 5 minutes apart, 10 minutes apart, etc.

Additionally, or alternatively, document identification system 210 may identify quantities of updates in a particular period of time and/or update frequencies associated with documents 105 and 110 based on identifying the sets of updates associated with documents 105 and 110. For example, document identification system 210 may identify that document 105 is updated three times in a particular week, and that document 110 is also updated three times in the same week. Such a scenario may occur when documents 105 and 110 are related to each other, and both receive similar updates. In some implementations, document identification system 210 may identify that document 105 is updated an average of four times per week, and that document 110 is updated an average of five times per week. Document identification system 210 may generate the verification score based on identifying that document 105 is updated an average of four times per week, and that document 110 is updated an average of five times per week.

Figure 8:
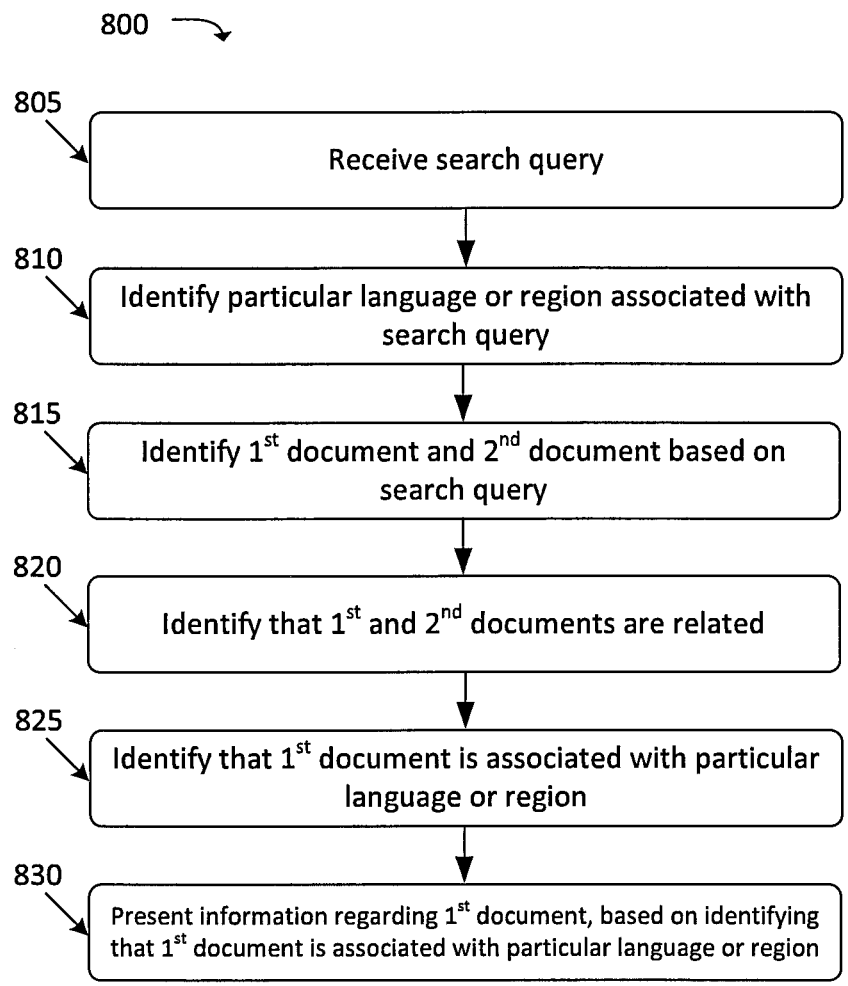
FIGS. 8 and 9 illustrate flowcharts of example processes for presenting information regarding a document that is a translation of another document, according to one or more implementations described herein.
Figure 9:
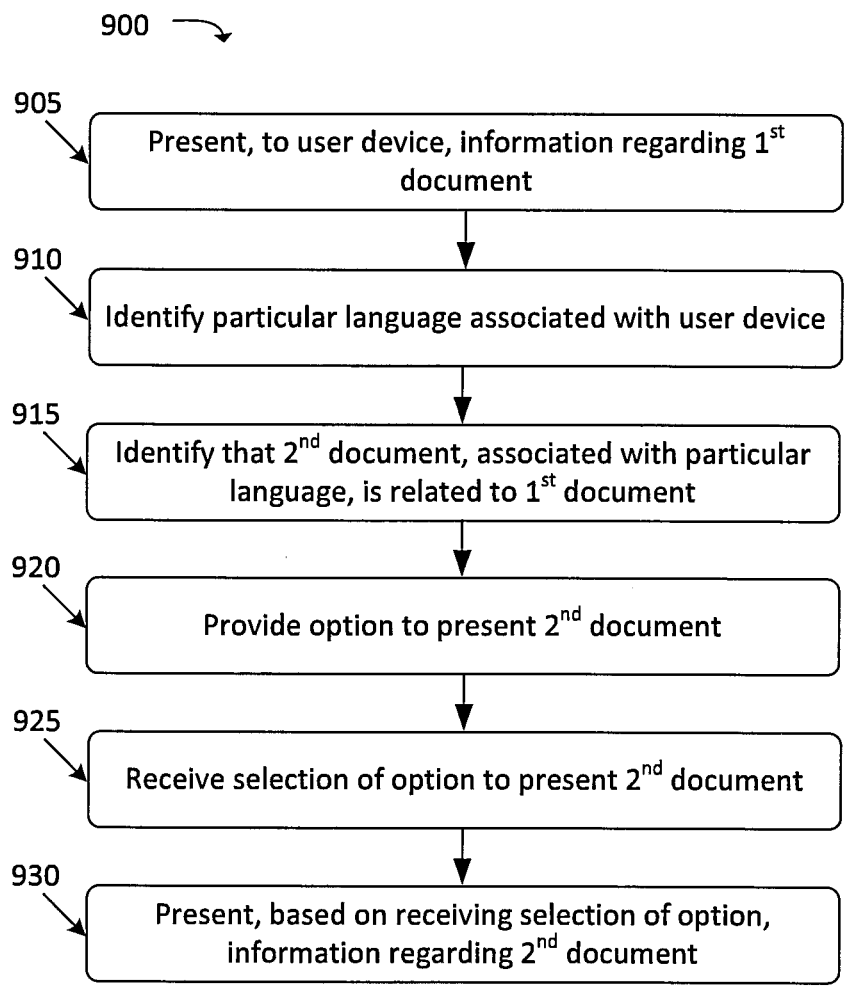

FIGS. 8 and 9 illustrate flowcharts of example processes 800 and 900, respectively, for presenting a document that is related to another document. In some implementations, one or both of processes 800 and/or 900 may be performed by document identification system 210. In some implementations, one or both of processes 800 and/or 900 may be performed by one or more other components instead of, or possibly in conjunction with, document identification system 210. For example, in some implementations, some or all of process 800 and/or some or all of process 900 may be performed by user device 205 and/or search engine server 215.

Process 800, shown in FIG. 8, may include receiving a search query (block 805). For example, document identification system 210 may receive a search query from a user device, such as user device 205. Assume, for example, that the search query includes the phrase "jim's bikes."

Process 800 may also include identifying a particular language or a particular region associated with the search query (block 810). For example, document identification system 210 may identify that the language associated with the search query "jim's bikes" is English. In order to identify the language, document identification system 210 may analyze one or more words of the search query. For example, document identification system 210 may identify that at least a particular proportion and/or quantity of the words of the search query are English words. Additionally, or alternatively, document identification system 210 may receive information from user device 205 indicating that the language associated with the search query is English. For instance, document identification system 210 may receive information, associated with a web browser associated with user device 205, which indicates that the search query is associated with the English language. Additionally, or alternatively, document identification system 210 may receive geographic location information from user device 205, which may indicate that user device 205 is located in a particular geographical region that is associated with the English language.

Process 800 may further include identifying a first document and a second document based on the search query (block 815). For example, document identification system 210 may identify, and/or receive information regarding, a set of documents that are responsive to the search query. Document identification system 210 may receive this information from a search engine server, such as search engine server 215. Assume, for this example, that the set of documents includes document 105 and document 110, shown in FIG. 1A.

Process 800 may additionally include identifying that the first and second documents are related (block 820). As described above, documents 105 and 110 may have been identified as being related via, for example, process 400. Document identification system 210 may identify information identifying that documents 105 and 110 are related— e.g., information stored at block 435. As described above, this information may indicate that document 105 includes a translation of some or all of document 110, and/or that document 110 includes a translation of some or all of document 105.

Process 800 may also include identifying that the first document is associated with the particular language or region (block 825). For instance, as described above, document identification system 210 may identify a language and/or geographical region associated with some or all of the documents identified at block 820. Continuing with the above example, document identification system 210 may identify that document 105 is associated with the English language— that is, the same language as identified as being associated with the search query, at block 810.

Process 800 may further include presenting information regarding the first document, based on identifying that the first document is associated with the particular language or region (block 830). For example, document identification system 210 may output a search result document, which includes information regarding documents that are responsive to the search query received at block 805. The information regarding the documents, included in the search result document, may be presented in an order based on search result scores. A particular search result score for a particular document may be based on a relevance of the particular document to the search query, an amount of traffic to and/or from the particular document, a quantity of links to and/or from the particular document, an age of the particular document, and/or any other factor.

Assume that documents 105 and 110 are associated with the highest search result scores, of the documents identified based on the search query. In some implementations, based on identifying that document 105 is associated with the same language as the search query, document identification system 210 may include information regarding document 105 in the search result document, and forgo including information regarding document 110, even when document 110 is associated with a higher score than other documents.

Figure 10:
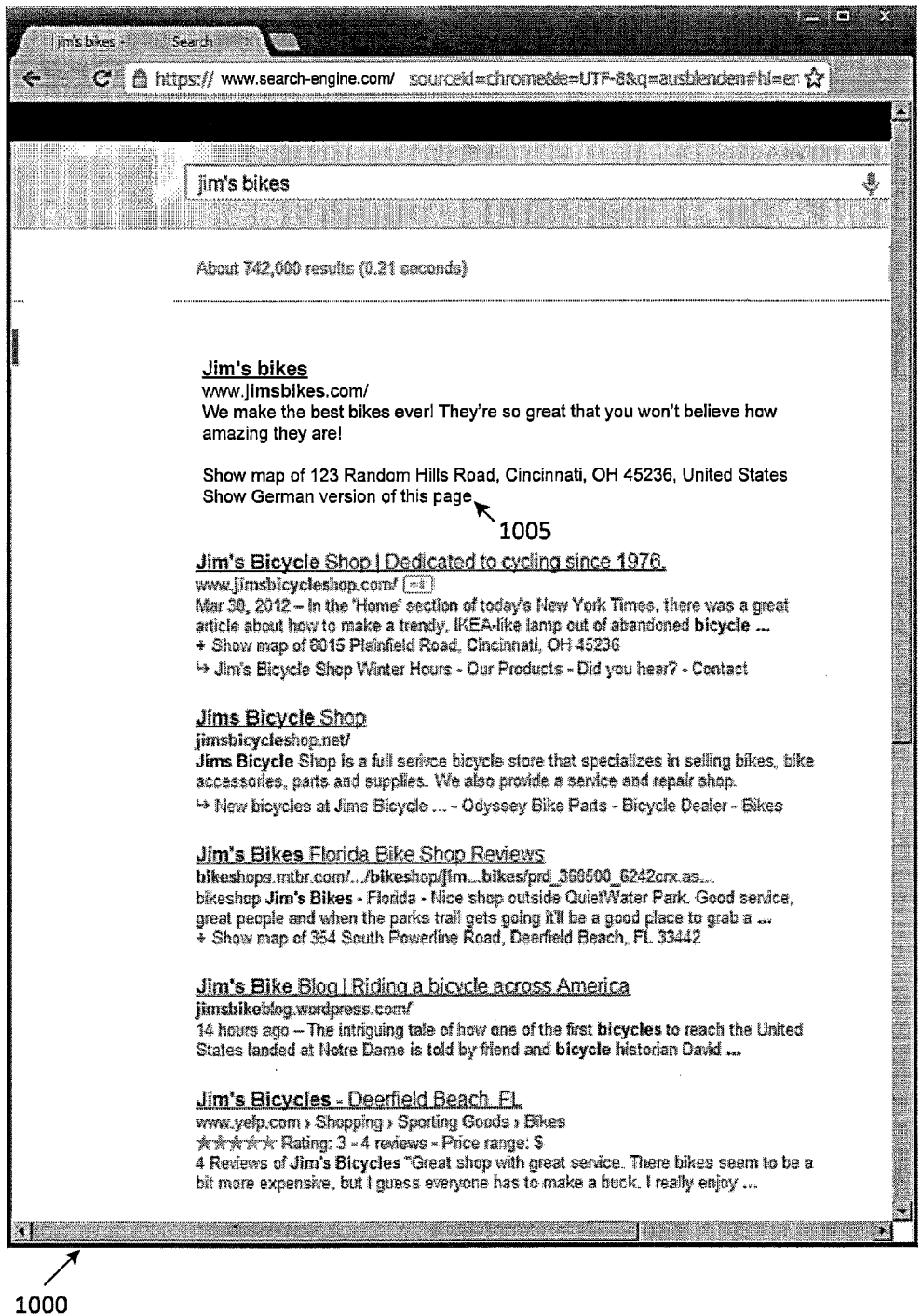
FIGS. 10 and 11 illustrate example documents, according to one or more implementations described herein.

Additionally, or alternatively, the search result document may include information regarding both documents 105 and 110. The information regarding document 110 may be presented in a different format than the information regarding document 105 and/or other documents. For example, as shown in FIG. 10, search result document 1000 may include information regarding document 105—i.e., information regarding the document located at www.jimsbikes.com. Search result document 1000 may also include link 1005, which provides an option to obtain a German version of the page. This link may include a link to document 110, which is related to document 105.

In some implementations, the search result document may include information regarding both documents 105 and 110 when one document does not include a translation of the other. Such a situation may indicated by a relatively low verification score—e.g., a verification score that does not satisfy a particular threshold. For example, assume that document identification system 210 identifies that that a search query is associated with the German language, and that documents 105 and 110—e.g., an English document and a German document, respectively—are responsive to the search query. Further assume that the verification score, associated with documents 105 and 110, does not satisfy a particular threshold. In other words, assume that document identification system 210 identifies that document 105 and 110 are not similar beyond a particular threshold. In this situation, the search result document may include information regarding both documents 105 and 110.

Although a series of blocks is shown in FIG. 8, in some implementations, process 800 may include fewer, additional, or different blocks. For example, in some implementations, process 800 may include identifying that the second document is not associated with the language associated with the search query. In some such implementations, document identification system 210 may present information regarding the first document further, or alternatively, based on identifying that the second document is not associated with the language associated with the search query.

Figure 11:
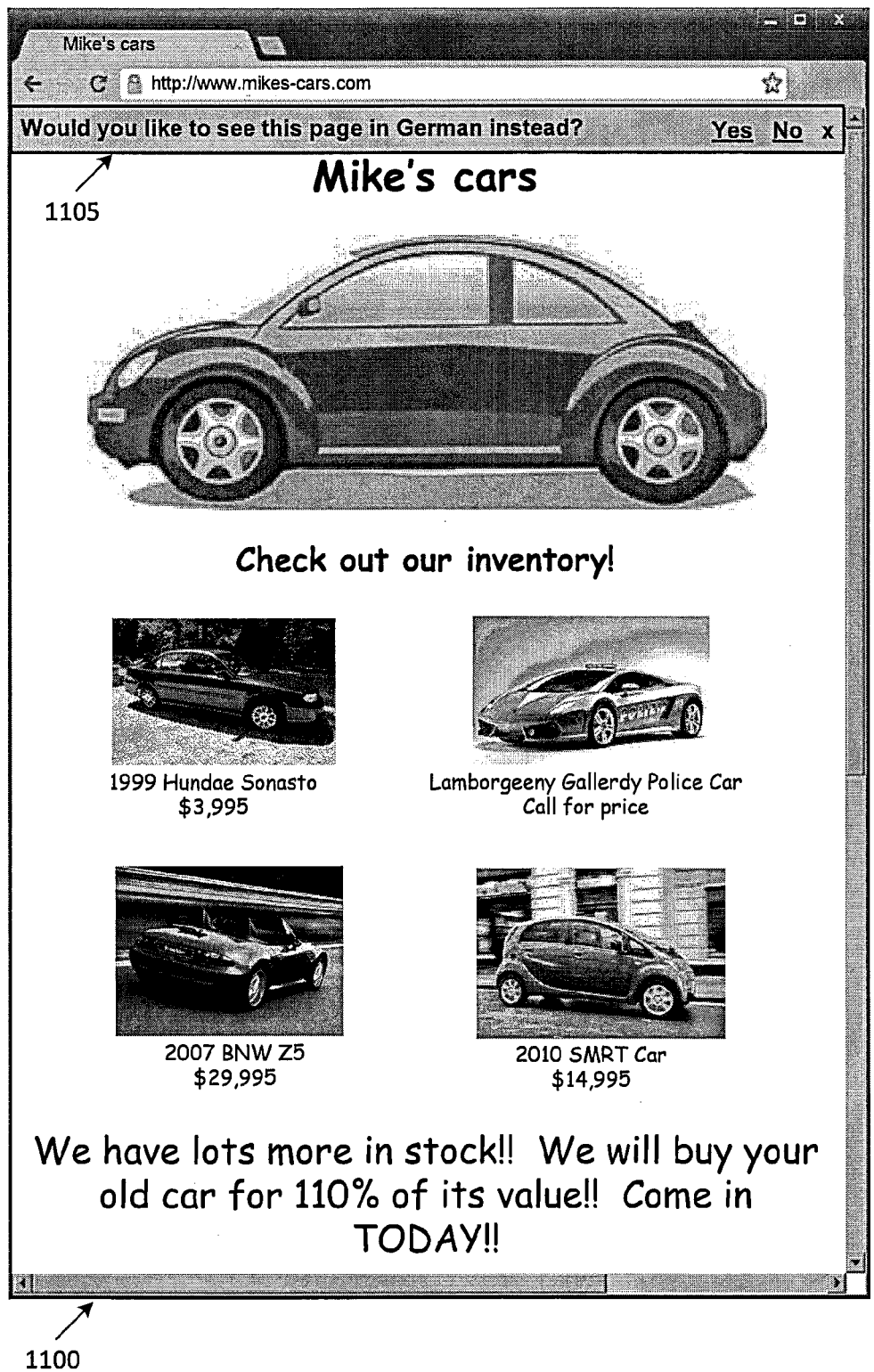

Process 900, shown in FIG. 9, may include presenting, to a user device, information regarding a first document (block 905). For example, document identification system 210 may present a document, and/or a link to a document, to user device 205. Referring to FIG. 11, document identification system 210 may provide document 1100 to user device 205.

Process 900 may also include identifying a particular language associated with the user device (block 910). For example, similar to techniques described above, document identification system 210 may identify a language associated with user device 205. For instance, document identification system 210 may receive information regarding a language associated with a web browser of user device 205, information regarding a geographical location of user device 205, and/or may use any other information to identify the language associated with user device 205.

Process 900 may further include identifying that a second document, that is associated with the particular language, is related to the first document (block 915). For example, document identification system 210 may identify that another document has been identified—e.g., via process 400 and/or via any other technique—as including a translation of some or all of the content of the first document.

Process 900 may additionally include providing an option to present the second document (block 920). For example, document identification system 210 may present an option, to user device 205, to present the second document, which is related to the first document. In some implementations, this option may be displayed by user device 205 via a web browser. For example, referring to FIG. 11, user device 205 may present option 1105 via a web browser. As shown in FIG. 11, option 1105 may include a phrase, such as "Would you like to see this page in German instead?"

Process 900 may also include receiving a selection of the option to present the second document (block 925). For instance, document identification system 210 may receive an indication from user device 205, such as an indication that option 1105 has been selected by, for example, a user associated with user device 205.

Process 900 may further include presenting, based on receiving the selection of the option, information regarding the second document (block 930). For example, document identification system 210 may provide the second document, and/or a link to the second document, to user device 205. User device 205 may display the second document in lieu of, or in addition to, the first document.

Although a series of blocks is shown in FIG. 9, in some implementations, process 900 may include fewer, additional, or different blocks. Further, as mentioned above, some or all of process 900 may be performed by user device 205 in some implementations. For example, user device 205 may identify the language associated with user device 205—e.g., a particular language associated with a web browser program associated with user device 205. User device 205 may receive information identifying that a second document, associated with the particular language, has been identified. User device 205 may provide the option to present the second document via, for example, the web browser program.

Some implementations, described herein, may allow one or more devices to identify documents that are related to each other. Specifically, for example, a system according to one or more implementations may be configured to identify a first document that includes a translation of a second document. In some implementations, the system may identify a first link from the first document to the second document, and/or a second link from the second document to the first document. The system of some implementations may identify that the first and/or second links include relation indicators, such as a name of a language, a name of a geographical region, a picture of a flag, etc.

In some implementations, the system may perform one or more verification processes to verify that these documents are related. In some implementations, the system may present information regarding the related documents in a manner that indicates that these documents are related. By identifying documents that are related to each other, the system of some implementations may provide information regarding related documents in an efficient manner, thus improving a user's experience.

The foregoing description provides illustration and description, but is not intended to be exhaustive or to limit the implementations to the precise form disclosed. Modifications and variations are possible in light of the above description or may be acquired from practice of the implementations. For example, while series of blocks have been described with regard to FIGS. 4 and 6-9, the order of the blocks may be modified in other implementations. Further, non-dependent blocks may be performed in parallel.

Further, while the above description provided examples in the context of links, in practice, systems and or methods of some implementations may implement some or all of the above concepts based on type of reference from one document to another. Examples of such a reference may include a drop-down menu, a combo box, a list box, a check box, a radio button, and/or any other type of element that includes a reference from document to another. For example, at block 405, document identification system 210 may identify a reference, in a drop-down menu, from a first document to a second document.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   identifying, in a first document and by one or more processors of one or more server devices, a reference to a second document,
   the second document being different than the first document;
   identifying, by one or more processors of the one or more server devices, that the reference to the second document is associated with a relation indicator,
   the relation indicator being associated with a link that references the second document;
   determining, based on identifying that the reference to the second document is associated with the relation indicator and by one or more processors of the one or more server devices, that content of the second document is related to content of the first document,
   the determining that the content of the second document is related to the content of the first document comprising:
   translating the first document to obtain a translated first document,
   the translated first document being in a language that matches a language of the second document;
   comparing the translated first document to the second document to obtain a measure of similarity between the translated first document and the second document; and
   determining, based on the comparing, that the content of the second document is related to the content of the first document when the measure of similarity satisfies a particular similarity threshold; and
   processing, by one or more processors of the one or more server devices, the second document based on determining that the content of the second document is related to the content of the first document.

2. The method of claim 1, where, when identifying that the reference to the second document is associated with the relation indicator, the method includes:
   identifying that the reference to the second document is associated with at least one of:
   a reference to a language,
   a name of a language,
   an image that represents a language,
   a name of a geographic region, or
   an image that represents a geographic region.

3. The method of claim 1, where
   the reference to the second document includes the link, and
   identifying that the reference to the second document is associated with the relation indicator includes:
   analyzing anchor text associated with the link; and
   identifying that the anchor text, associated with the link, includes the relation indicator.

4. The method of claim 1, further comprising:
   receiving, from a client device, a search query;
   identifying that the first document and the second document are responsive to the search query;
   identifying a particular language or a particular region associated with the client device; and
   identifying that the second document is associated with the particular language or the particular region,
   where, when processing the second document, the method includes:
   providing, for presentation, information identifying the second document as a search result for the search query; and
   forgoing providing, for presentation, information identifying the first document as a search result for the search query based on identifying that the second document is associated with the particular language or the particular region and determining that the content of the second document is related to the content of the first document.

5. The method of claim 1, further comprising:
   providing information regarding the first document for display at a client device;
   identifying a particular language associated with the client device; and
   identifying that the second document is associated with the particular language,
   where, when processing the second document, the method includes:

providing, for presentation and in connection with the information regarding the first document, an option to access the second document.

6. The method of claim 1, further comprising:
identifying, in the second document, a reference to the first document,
where, when determining that the content of the second document is related to the content of the first document, the method includes:
determining that the content of the second document is related to the content of the first document based on identifying that the second document includes the reference to the first document.

7. The method of claim 1, where, when determining that the content of the second document is related to the content of the first document, the method includes:
identifying a first update frequency associated with the first document;
identifying a second update frequency associated with the second document;
comparing the first update frequency and the second update frequency to obtain the measure of similarity between the first update frequency and the second update frequency; and
determining, based on comparing the first update frequency and the second update frequency, that the content of the second document is related to the content of the first document when the measure of similarity satisfies the particular similarity threshold.

8. The method of claim 1, further comprising:
identifying selection activity regarding at least one of the first document or the second document,
where, when determining that the content of the second document is related to the content of the first document, the method further includes:
determining that the content of the second document is related to the content of the first document based on the identified selection activity.

9. A system comprising:
one or more devices to:
identify, in a first document, a reference to a second document, the second document being different than the first document;
identify that the reference to the second document is associated with a relation indicator,
the relation indicator being associated with a link that references the second document;
determine, based on identifying that the reference to the second document is associated with the relation indicator, that content of the second document is related to content of the first document;
where the one or more devices, when determining that the content of the second document is related to the content of the first document, are further to:
translate the first document to obtain a translated first document,
the translated first document being in a language that matches a language of the second document;
compare the translated first document to the second document to obtain a measure of similarity between the translated first document and the second document; and
determine, based on the comparing, that the content of the second document is related to the content of the first document when the measure of similarity satisfies a particular similarity threshold; and process the second document based on determining that the content of the second document is related to the content of the first document.

10. The system of claim 9, where the one or more devices, when identifying that the reference to the second document is associated with the relation indicator, are further to:
identify that the reference to the second document is associated with at least one of:
a reference to a language,
a name of a language,
an image that represents a language,
a name of a geographic region, or
an image that represents a geographic region.

11. The system of claim 9, where
the reference to the second document includes the link, and
the one or more devices, when identifying that the reference to the second document is associated with the relation indicator, are further to:
analyze anchor text associated with the link; and
identify that the anchor text, associated with the link, includes the relation indicator.

12. The system of claim 9, where the one or more devices are further to:
identify, in the second document, a reference to the first document,
where the one or more devices, when determining the content of the second document is related to the content of the first document, are further to:
determine that the content of the second document is related to the content of the first document based on identifying that the second document includes the reference to the first document.

13. The system of claim 9, where the one or more devices, when determining that the content of the second document is related to the content of the first document, are further to:
identify a first update frequency associated with the first document;
identify a second update frequency associated with the second document;
compare the first update frequency and the second update frequency to obtain the measure of similarity between the first update frequency and the second update frequency; and
determine, based on comparing the first update frequency and the second update frequency, that the content of the second document is related to the content of the second document when the measure of similarity satisfies the particular similarity threshold.

14. The system of claim 9, where the one or more devices are further to:
identify selection activity regarding at least one of the first document or the second document,
where the one or more devices, when determining that the content of the second document is related to the content of the first document, are further to:
determine that the content of the second document is related to the content of the first document based on the identified selection activity.

15. A computer-readable medium, comprising:
a plurality of computer-executable instructions which, when executed by one or more processors, cause the one or more processors to:
identify, in a first document, a reference to a second document, the second document being different than the first document;
identify that the reference to the second document is associated with a relation indicator, the relation indicator being associated with a link that references the second document;

determine, based on identifying that the reference to the second document is associated with the relation indicator, that content of the second document is related to content of the first document, the plurality of computer-executable instructions to determine that the content of the second document is related to the content of the first document including:

one or more instructions to translate the first document to obtain a translated first document, the translated first document being in a language that matches a language of the second document, one or more instructions to compare the translated first document to the second document to obtain a measure of similarity between the translated first document and the second document, and one or more instructions to determine, based on the comparing, that the content of the second document is related to the content of the first document when the measure of similarity satisfies a particular similarity threshold; and process the second document based on determining that the content of the second document is related to the content of the first document.

16. The computer-readable medium of claim 15, where the plurality of computer-executable instructions to identify that the reference to the second document is associated with the relation indicator include:

one or more instructions to identify that the reference to the second document is associated with at least one of:
a reference to a language,
a name of a language,
an image that represents a language,
a name of a geographic region, or
an image that represents a geographic region.

17. The computer-readable medium of claim 15, where the reference to the second document includes the link, and the plurality of computer-executable instructions to identify that the reference to the second document is associated with the relation indicator include:

one or more instructions to analyze anchor text associated with the link; and one or more instructions to identify that the anchor text, associated with the link, includes the relation indicator.

18. The computer-readable medium of claim 15, where the plurality of computer-executable instructions further include:

one or more instructions to identify, in the second document, a reference to the first document, where the content of the second document is determined as being related to the content of the first document further based on identifying that the second document includes the reference to the first document.

19. The computer-readable medium of claim 15, where the plurality of computer-executable instructions determine that the content of the second document is related to the content of the first document include:

one or more instructions to identify a first update frequency associated with the first document;

one or more instructions to identify a second update frequency associated with the second document;

one or more instructions to compare the first update frequency and the second update frequency to obtain the measure of similarity between the first update frequency and the second update frequency; and one or more instructions to determine, based on comparing the first update frequency and the second update frequency, that the content of the second document is related to the content of the first document when the measure of similarity satisfies the particular similarity threshold.

20. The computer-readable medium of claim 15, where the plurality of computer-executable instructions further include:

one or more instructions to identify selection activity regarding at least one of the first document or the second document, where the plurality of computer-executable instructions to determine that the content of the second document is related to the content of the first document include:

one or more instructions to determine that the content of the second document is related to the content of the first document based on the identified selection activity.

* * * * *

UNITED STATES PATENT AND TRADEMARK OFFICE
CERTIFICATE OF CORRECTION

PATENT NO. : 8,892,596 B1
APPLICATION NO. : 13/569948
DATED : November 18, 2014
INVENTOR(S) : Christopher Semturs et al.

Page 1 of 1

It is certified that error appears in the above-identified patent and that said Letters Patent is hereby corrected as shown below:

In the Claims

Claim 19, Column 26, line 14, after "excutable instructions" insert -- to --.

Signed and Sealed this
Twenty-eighth Day of July, 2015

Michelle K. Lee
*Director of the United States Patent and Trademark Office*